(12) United States Patent
Barkowski et al.

(10) Patent No.: US 7,376,508 B2
(45) Date of Patent: May 20, 2008

(54) METHOD AND SYSTEM FOR MAKING AVAILABLE DRIVING LANE RECOMMENDATIONS

(75) Inventors: Andre Barkowski, Salzgitter (DE); Dietmar Schloegl, Sibbesse (DE)

(73) Assignee: Robert Bosch GmbH, Stuttgart (DE)

( * ) Notice: Subject to any disclaimer, the term of this patent is extended or adjusted under 35 U.S.C. 154(b) by 627 days.

(21) Appl. No.: 10/252,937

(22) Filed: Sep. 23, 2002

(65) Prior Publication Data

US 2003/0074131 A1 Apr. 17, 2003

(30) Foreign Application Priority Data

Sep. 22, 2001 (DE) ................. 101 46 744

(51) Int. Cl.
*G01C 21/00* (2006.01)
*G01C 21/32* (2006.01)
*G01F 17/00* (2006.01)

(52) U.S. Cl. ............... 701/208; 701/211; 340/995.2; 340/995.21

(58) Field of Classification Search ........... 701/301, 701/302, 206–209, 211, 202, 213, 1, 200, 701/300; 340/995.1, 995.19, 988, 990, 995.2, 340/901, 995.18, 995.27; 707/1
See application file for complete search history.

(56) References Cited

U.S. PATENT DOCUMENTS

| | | | |
|---|---|---|---|
| 5,519,619 A | 5/1996 | Seda | |
| 6,269,304 B1 | 7/2001 | Kaji et al. | |
| 6,388,582 B2 * | 5/2002 | Yamashita et al. | 340/988 |
| 6,446,000 B2 * | 9/2002 | Shimabara | 701/209 |
| 6,510,386 B2 * | 1/2003 | Sakashita | 701/211 |
| 2001/0013831 A1 | 8/2001 | Harlign et al. | |
| 2001/0013837 A1 | 8/2001 | Yamashita et al. | |
| 2001/0056326 A1 * | 12/2001 | Kimura | 701/208 |
| 2002/0013659 A1 * | 1/2002 | Kusama | 701/211 |

FOREIGN PATENT DOCUMENTS

| | | |
|---|---|---|
| DE | 100 42 878 | 5/2001 |
| EP | 0 892 248 | 1/1999 |
| JP | 6-52493 | 2/1994 |
| JP | 6-295399 | 10/1994 |
| JP | 2000 18956 | 1/2000 |

* cited by examiner

*Primary Examiner*—Jack W. Keith
*Assistant Examiner*—Edward Pipala
(74) *Attorney, Agent, or Firm*—Kenyon & Kenyon LLP

(57) ABSTRACT

In order to create a method for making available driving lane recommendations for each driving direction relating to at least one curb and interlinked with one another, as well as a system related thereto, which improve the quality of the driving instructions provided by a navigation device via optimized processing of the driving lanes on roads, in particular at intersections, it is recommended that (a) a curb (10, 11, 12; 10', 12', 15') be assigned at least one lane list (20) whose elements (20.$a$.1.1, 20.$a$.1.2, 20.$a$.2) contain lane information on the totality of the driving lanes assigned to the curb (10, 11, 12; 10', 12', 15'); (b) each of the driving lanes be assigned at least one lane data list (30; 40) whose elements (30.$b$.1, 30.$b$.2; 40.$b$.1, 40.$b$.2) each contain lane data information on the particular driving lane; and (c) each follow-on driving lane succeeding the driving lane be assigned at least one follow-on lane list (50; 60; 70) whose elements (50.$c$.1, 50.$c$.2, 50.$c$.3, 50.$c$.4; 60.$c$.1, 60.$c$.2, 60.$c$.3, 60.$c$.4; 70.$c$.1, 70.$c$.2, 70.$c$.3, 70.$c$.4) each contain follow-on lane information, interlinked with the lane data information of the preceding driving lane, on the particular follow-on driving lane.

9 Claims, 4 Drawing Sheets

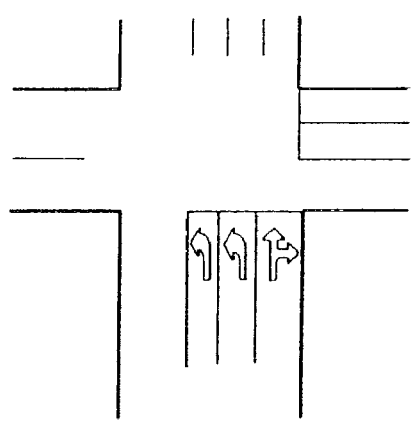
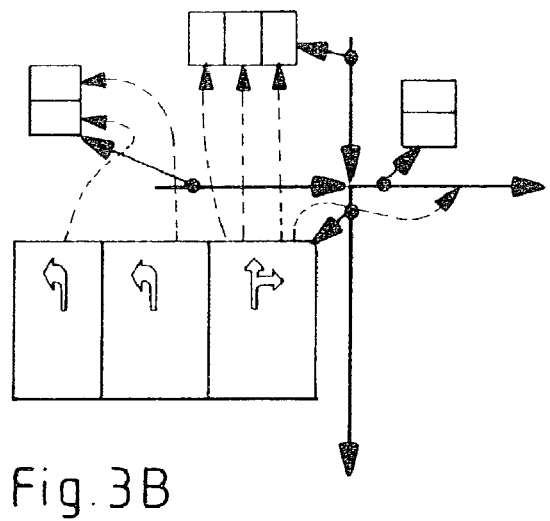
Fig. 3A          Fig. 3B
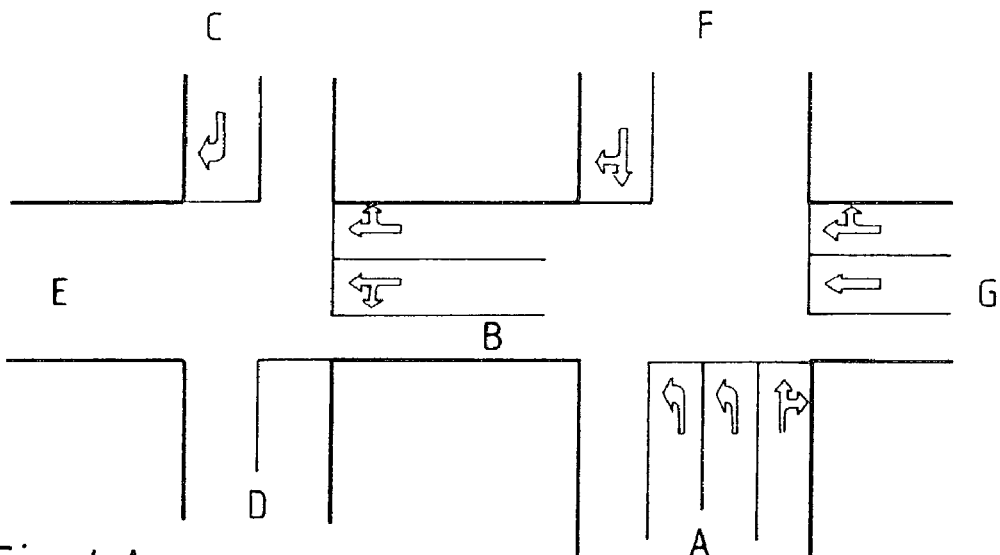
Fig. 4A
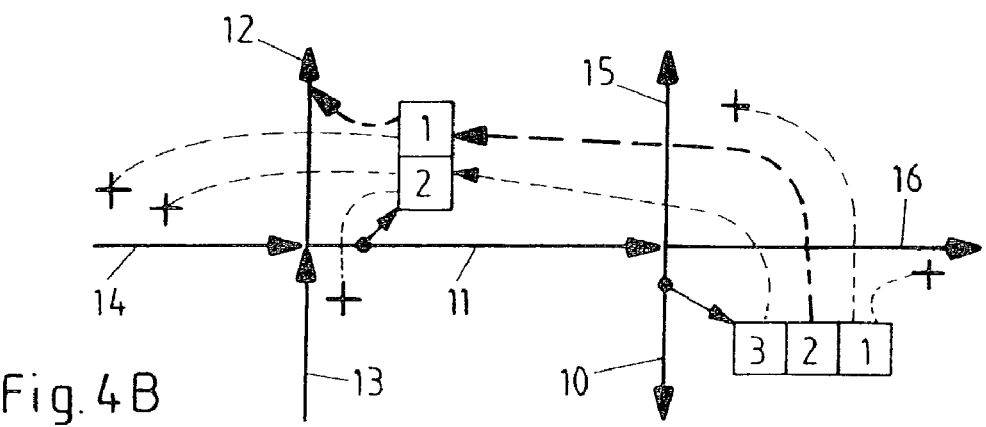
Fig. 4B

METHOD AND SYSTEM FOR MAKING AVAILABLE DRIVING LANE RECOMMENDATIONS

FIELD OF THE INVENTION

The present invention relates to the use, in a navigation device, of a method for making available driving lane recommendations for each driving direction relating to at least one curb or one segment of road and interlinked with one another. The present invention further relates to a system for implementing such a method.

BACKGROUND INFORMATION

In means of transportation such as motor vehicles, permanently installed navigation devices simply, quickly, and safely guide the driver of a means of transportation from the current location to a desired destination without the driver of the means of transportation first having to elaborately plan a route and obtain appropriate maps.

For this purpose, appropriate navigation data based on charts, maps, or street maps are available stored, for example, on CD-ROM (=Compact Disc-Read Only Memory) or on DVD (=Digital Versatile Disc). The navigation device uses GPS (=Global Positioning System), for example, in order to determine the current location and calculate the appropriate navigation instructions that lead to the predetermined destination. The navigation data, in this connection, preferably contains data on roads and paths for motor vehicles.

An important component of the above-mentioned basic function of a navigation device is the processing of the driving lanes on the roads, especially before, at, and after intersections. Driving lanes, in this case, are to be understood as the fanning out of the driving directions, in particular before an intersection, painted on the road.

The processing of such driving lanes, which may be found directly on the road surface or on signs installed above the roads such as in the form of sign bridges and/or electronic alternative-route indicators having directional symbols and/or distant destinations, will initially be required only at freeway interchanges, but later also at all other intersections having driving lanes.

In this context, it must be considered, however, that so far, in conventional navigation devices, the processing of linked consecutive driving lanes is still inadequate. The driver of the means of transportation is not provided with information by the navigation device enabling him to optimally navigate the means of transportation through street traffic, especially in the case of a rapid succession of multiple intersections or forks in the road.

SUMMARY OF THE INVENTION

Based on the above-mentioned disadvantages and shortcomings, the object of the present invention is to create a method as well as a system, of the type mentioned at the outset, which improve the quality of the driving instructions provided by a navigation device via optimized processing of driving lanes on roads, in particular at intersections.

According to the teaching of the present invention, all curbs of the respective lanes are therefore given attributes carrying certain information explained in more detail below. Inserting the driving lanes into the curbs is carried out according to a particularly inventive further development by attaching the driving lanes to the particular curbs as new attributes.

Independent of or in conjunction with this, the curbs should expediently only carry one lane situation in each driving direction, otherwise they should be divided. The information initially contains only one list of available lanes (="lane list") per driving direction, i.e., in digitization direction of the curb or counter to the digitization direction of the curb. The sequence of the elements of the lane list should in this connection expediently coincide with the sequence of the lanes on the street, and should be counted from the outer curb of the road.

According to an advantageous further development of the present invention, the information further contains the length on which the lanes are available starting from the particular end of the curb; this avoids partitions of the curb in an advantageous manner in case lanes are only available at the end of the curb.

Each element of the lane list preferably contains the directional symbol associated with it, as well as optional additional information on special uses and other restrictions such as reservation of the lane for buses, taxis, or the like. This may also include—in a manner essential to the present invention—information in each element of the lane list regarding whether or not the lane marker for two adjacent driving lanes, i.e., for the adjacent left-hand lane or the adjacent right-hand lane, may be crossed by the driver of the means of transportation.

A relevant component of the information may also be at least one intersection approaching in the driving direction which is reached via this lane. If a curb is referred to that also has lanes, reference may be made to one of these lanes if it is understood to be a continuation of the original lane.

According to an advantageous embodiment of the present invention, the curbs, reference having been made to themselves or to their lanes, are linked to the same intersection as the original curb, but do not have to be directly meshed with same, since the intersection may also be complex, i.e., it may not consist of only one node, but of multiple nodes. In this case, it cannot always be guaranteed that it is possible to follow the lanes within these complex intersections.

In connection with the practical implementation and the actual application possibilities of the present invention, attention must be paid to the fact that a situation-and/or time-dependent switching of the lanes must be expected, as happens with greater frequency today via electronic alternative-route indicators in light of increased traffic densities, especially in city traffic with access and exit roads or on freeways having emergency lanes. The design of the data, therefore, should expediently facilitate the representation of such a dependency accordingly.

Generally, in view of the present invention, the fact must be considered that the quality of the acquisition of lanes may not in some cases be as high as the quality of the attributes relevant for the route search (one-way streets, turning prohibitions and the like). This may possibly result in discrepancies between route search and navigation using driving lanes, i.e., there are driving lanes at an intersection, but it is not possible to find a driving lane corresponding to the calculated route. Construction sites or the like also come to mind in this regard, of course, which in most cases involve detours or at least shifting of lanes.

In an embodiment essential to the present invention, lane information may also be used to make a perspective representation of the intersection and/or street existing in reality more realistic. For this purpose, the described data model, implemented according to the present invention in terms of method as well as system, contains all relevant information.

According to the present invention, the possibility of at least one selected driving lane carrying distant-destination information must be considered, so that this information may be included for the purpose of creating directions for getting into the correct lane, regardless of where the actual destination is (—>navigation device: "Take the lane for Dortmund!")

Regarding the requirements on raw data for the method and the system according to the present invention, the data for a meaningful use of driving lanes for navigating must be selected such that the following categories and parameters may be filled with (data) content:

- number of driving lanes at the approaching end of the traveled curb;
- type of symbols (if any) with which the individual driving lanes are marked on the road or on signs;
- driving lanes that may be used, in other words those that are not bus or taxi lanes;
- adjacent driving lanes, between which it is permitted to switch; and
- driving lane/s that is/are to be used in order to reach the subsequent curb, calculated by the route search algorithm, and the correct driving lane for continuing the route.

In this connection, the present invention also extends to a starting point essential to the present invention, where driving lanes may be digitized as separate curbs. In this case, the route search algorithm would assume the task of selecting the correct driving lane. It must be noted, however, that, at least at the moment, there still exist various inherent inadequacies with a mode of this type such as a difficult-to-manage data quantity, a certain locating uncertainty, digitization only from aerial photos, as well as the need for frequent changes.

The present invention, finally, relates to a navigation device operating according to a method of the type described above and/or having at least one system of the type described above.

BRIEF DESCRIPTION OF THE DRAWINGS

FIG. 3A schematically shows a basic driving lane combination with intersection.

FIG. 3B schematically shows a curb diagram assigned to the basic driving lane combination from FIG. 3A.

FIG. 4A schematically shows an expanded driving lane combination with two intersections.

FIG. 4B schematically shows a curb diagram assigned to the expanded driving lane combination from FIG. 4A.

DETAILED DESCRIPTION

Figure 1A:
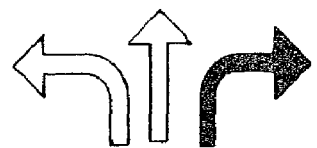
FIG. 1A schematically shows a navigational driving lane recommendation for the right-hand lane.

In the method and system according to the present invention, the driver of a means of transportation is able to receive information, in addition to the usual driving instruction, via driving lane information before reaching a decision point regarding which of the available driving lanes is best taken in order to be able to easily follow this driving instruction (see FIG. 1A, according to which the driver of the means of transportation would have to pick the right-hand one of the three driving lanes).

Figure 1B:
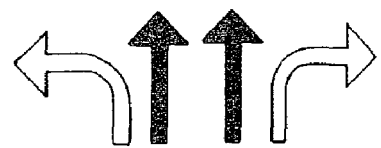
FIG. 1B schematically shows a navigational driving lane recommendation for the two center lanes.

In real street traffic situations, there may be multiple suitable driving lanes when choosing lanes (see FIG. 1B, according to which the driver of the means of transportation would have to pick the middle, i.e., one of the two center lanes). While it is relatively simple to graphically represent such a situation, which is a little more complex than the situation in FIG. 1A, the oral identification of multiple lanes is difficult, especially when more than three driving lanes are available.

The present invention provides a possible alternative embodiment where the graphical representation of the driving lanes on the display device or on the display of a navigation device should coincide as far as possible with what the driver of the means of transportation sees painted on the driving lane or marked on signs in front of him. The arrow symbols used there—if any—should be taken into consideration in the design of the graphics of the navigation device.

In this connection, a test should also be carried out to see whether the lane-changing instructions should replace or supplement the driving instructions at this location, and/or how the calculation of the driving instructions is affected by the presence of driving lanes.

In the driving lane recommendations according to FIGS. 1A or 1B, the change in direction at the immediately following decision point determines the driving lane selection. Should multiple lanes be available in one direction (see FIG. 1B for the "straight-ahead" direction), the navigation device recommends both lanes equally.

There are, however, also complex driving lane combinations, where the most favorable driving lane may only be selected if the route is viewed across more than one intersection (see FIG. 4A). In order to get from street A to street C in the extended driving lane combination according to FIG. 4A, the driver of the means of transportation on street A must take the center lane, then, on street B, the right-hand driving lane, in order to then be able to turn into street C. Should the driver of the means of transportation want to continue his journey on street E, the left-hand or center lane on street A would be available to him. Street D may only be reached if the left-hand driving lane on street A is used.

Such lane sequences are sometimes crucial for the driver of the means of transportation, i.e., if the driver of the means of transportation takes the incorrect lane—in other words the left-hand lane—on street A with the complex lane combination of FIG. 4A, he is subsequently not permitted to change lanes again and must continue his journey in departure from the planned route on street B or street D. But even if there is no such constraint and it is still permissible to change lanes, it is desirable to provide information on the most favorable lane in any case in order to minimize the number of lane change maneuvers that are often critical in city traffic.

For the concept described above it is basically not necessary to know whether the driving lanes have dotted or solid lane markers, i.e., whether or not a lane change is permitted. If the linking of the lanes at the intersections is correctly digitized, the described route search algorithm will—if at all—select a lane sequence that will not require lane changes at the particular curbs.

A correct interlinking of the driving lanes, however, is only possible if the number of lanes along each of the curbs does not change. This means that the curbs must be divided in places where the number of driving lanes changes. At freeway exits, where typically the number of driving lanes increases by an exit lane, a lane combination as shown in FIG. 2 results; here, the node or intersection point marked by a separate arrow in FIG. 2B only exists due to the change in the number of driving lanes.

Figure 2A:
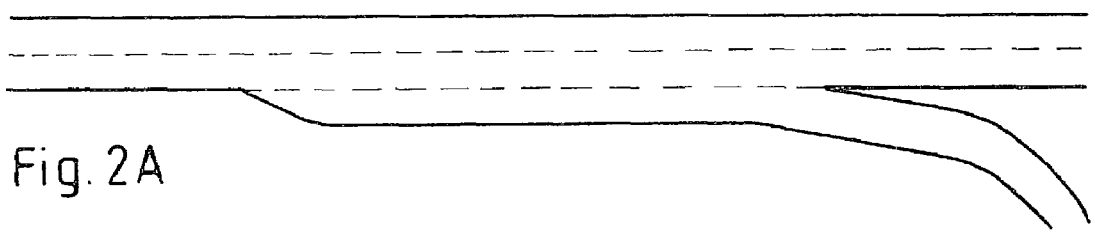
FIG. 2A schematically shows a lane combination with exit lane.
Figure 2B:
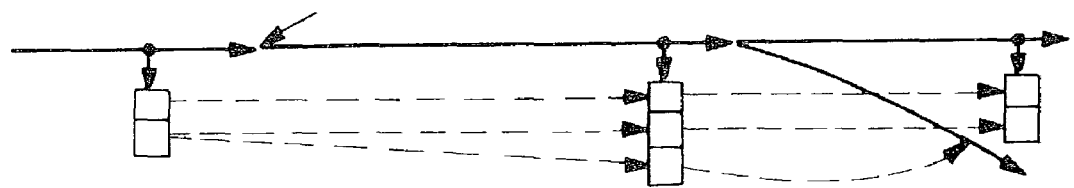
FIG. 2B schematically shows a curb diagram assigned to the driving lane combination from FIG. 2A.
Figure 2C:
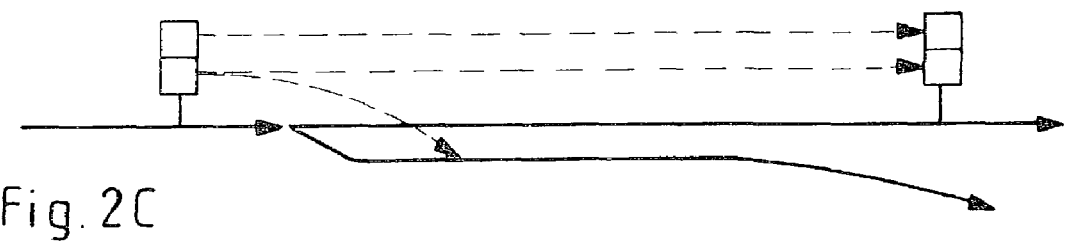
FIG. 2C schematically shows an alternative curb diagram assigned to the driving lane combination from FIG. 2A.

Alternatively, the exit according to FIG. 2A may also be digitized using a different course of a curb. This is how the exit lane is regarded as a separate driving lane according to FIG. 2C. The method according to the present invention may be used regardless of whether the curb diagram according to FIG. 2B or the curb diagram according to FIG. 2C has been chosen.

Regarding the "weave lanes" (merge or exit lanes), it must be added in this connection that, while in the lane combination depicted in FIG. 2A part of the expressway is recorded as having three lanes, this change in the number of lanes may only result in a lane change instruction if the expressway is to be left at the exit. In order to safely recognize this situation, the right-hand lane should be marked as a weave lane here. Lane-related instructions are only issued here if the weave lane must actually also be used.

However, it is not always possible to follow the selected route without changing lanes. Using the branching of two expressways shown as an example in FIG. 5A (in FIGS. 5A and 5B only the driving direction from right to left is shown), some situational examples can be illustrated; here it also becomes clear that for a complete description of the lane situation, the permissibility of crossing the lane markers must be known (dotted line, solid line, or both).

Route A->C->D, Route A->C->E:

Before the solid lane marker begins, the driver of the means of transportation must be guided into the right-hand driving lane (->route A->C->D) or into the left-hand driving lane (->route A->C->E) while still on street A in order to be able to follow the particular route.

Route A->C->F:

On street A, the driver of the means of transportation must first be guided into the left-hand driving lane and then into one of the left-hand lanes of street C; in other words, a lane change on street C is thus unavoidable.

Route B->C->D, Route B->C->E:

These routes cannot be followed by the driver of the means of transportation without crossing solid lines; there is a contradiction between the digitization of the driving lanes and the "turn restrictions," but an automatic check of the data for such inconsistencies is possible.

Route B->C->F:

On this route no lane change is necessary, regardless of which driving lane is entered, and since no decision must be made, a driving instruction is also superfluous.

As far as the concrete implementation of the method, as well as the system, according to the present invention regarding following the course of a lane along a route is concerned, the presented data model makes it possible to select and output the most favorable driving lane based on the calculated route. Here, all curbs ("oncecells") of the respective driving lanes are given attributes that carry certain information, explained in more detail below.

In this connection, curbs in each driving direction have only one lane situation, otherwise they are divided (see also the basic lane combination with intersection in FIG. 3A, as well as the curb diagram in FIG. 3B assigned to the driving lane combination in FIG. 3A, each in schematic form).

The procedure used in following the course of the lane will be explained via the schematic curb diagram according to FIG. 4B using the example of the complex driving lane situation with two intersections shown in FIG. 4A. The route was calculated in the curb sequence 10->11->12 (see FIG. 4B). The means of transportation here is on curb 10, and—according to the present invention—it must be determined which lane is the most advantageous for following the route.

Curb 10 as the starting curb has three lanes:
  Driving lane 1 points to curbs 15 and 16; curbs 15 and 16, however, are not part of the route, so that following driving lane 1 may be aborted;
  Driving lane 2 points to driving lane 1 of curb 11; curb 11 belongs to the route, so that driving lane 2 must continue to be followed to curb 11;
  Driving lane 3 points to driving lane 2 of curb 11; curb 11 belongs to the route, so that driving lane 3 must continue to be followed to curb 11.

Now two driving lanes—driving lane 2 and driving lane 3—of curb 10 have to continue to be followed; unambiguity has not yet been achieved, and the algorithm must be continued.

Curb 11 is the route successor, which means it is the successor curb of curb 10, and has two lanes that must continue to be followed:
  Driving lane 1 points to curbs 12 and 14; curb 12 belongs to the route, so that driving lane 1 must continue to be followed to curb 12; curb 14, however, is not part of the route, so that following driving lane 1 on curb 14 is not necessary;
  Driving lane 2 points to curbs 13 and 14; curbs 13 and 14, however, are not part of the route, so that following driving lane 2 may be aborted.

Now only one lane—lane 1 of curb 11—must continue to be followed, thus having achieved unambiguity, and the algorithm may be aborted, since driving lane 1 on curb 11 is the only "survivor," and the predecessor-driving lane 2 on curb 10 is the driving lane to be determined.

Figure 5A:
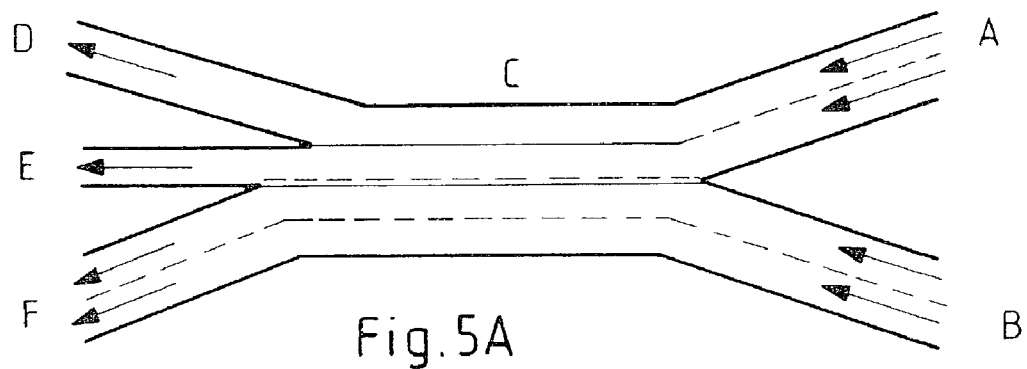
FIG. 5A schematically shows a further driving lane combination with branching of two expressways.
Figure 5B:
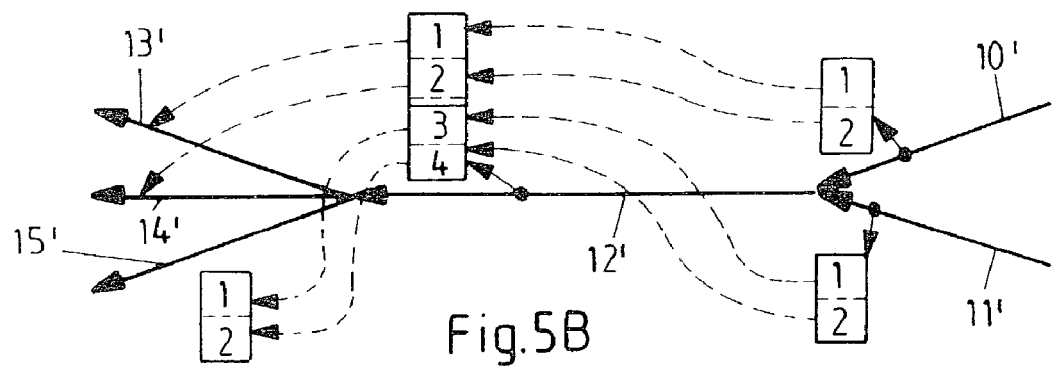
FIG. 5B schematically shows a curb diagram assigned to the further driving lane combination from FIG. 5A.

The procedure of following lanes will be explained based on another example of the driving lane combination shown in FIG. 5A occasioning necessary lane changes due to the intersecting of two expressways, using the schematic curb diagram according to FIG. 5B. The route was calculated in the curb sequence 10'->12'->15'. Here, the means of transportation is on curb 10', and it is to be determined, according to the present invention, which driving lane is the most advantageous for following the route.

Curb 10' as the originating curb has two driving lanes:
  Driving lane 1 points to driving lane 1 of curb 12'; curb 12' belongs to the route, so that driving lane 1 must continue to be followed to curb 12';
  Driving lane 2 points to driving lane 2 of curb 12'; curb 12' belongs to the route, so that driving lane 2 must continue to be followed to curb 12'.

Now two lanes—lane 1 and lane 2—must continue to be followed; unambiguity has not yet been achieved, and the algorithm must be continued.

Curb 12' is the route successor, which means it is the successor curb of curb 10', and has four driving lanes that must continue to be followed:

Driving lane 1 points to curb 13'; curb 13', however, is not part of the route, so that following driving lane 1 of curb 12' may be aborted.

Driving lane 2 points to curb 14'; curb 14', however, is not part of the route, so that following driving lane 2 of curb 12' may be aborted.

Now none of the lanes from curb 10' to be followed runs along the calculated route.

Driving lane 3 points to curb 15'; curb 15' belongs to the route, so that driving lane 3 to curb 15', which may be reached by a lane change from driving lane 2 at curb 12', has to continue to be followed.

Driving lane 4 points to curb 15'; curb 15' belongs to the route, so that driving lane 4 to curb 15', which may be reached by a lane change from driving lane 2 at curb 12' via driving lane 3, has to continue to be followed.

Now two driving lanes—driving lanes 1 and 2 at curb 15'—have "survived," so that the most advantageous driving lane sequence along the route is as follows:

Driving lane 2 in curb 10'
->Driving lane 2 in curb 12'
->Change to driving lane 3 or driving lane 4 in curb 12'
->Driving lane 1 or driving lane 2 in curb 15'.

Figure 6:
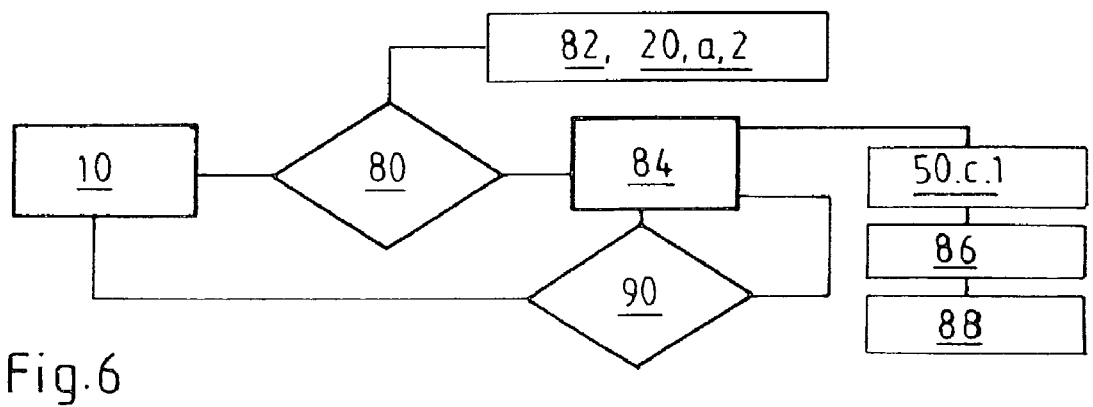
FIG. 6 schematically shows an "entity relationship" model of the present invention.

As a result, the method as well as the system according to the present invention may be abstracted in an abstract way in the form of an "entity-relationship" model shown in FIG. 6, where curb 10 carries digitization direction 82 and length 20.*a*.2 (->reference notation 80). Driving lane 84, being assigned destination name 88, symbol 86, and driving lane number 50.*c*.1, leads back to (->reference notation 90) curb 10.

Figure 7:
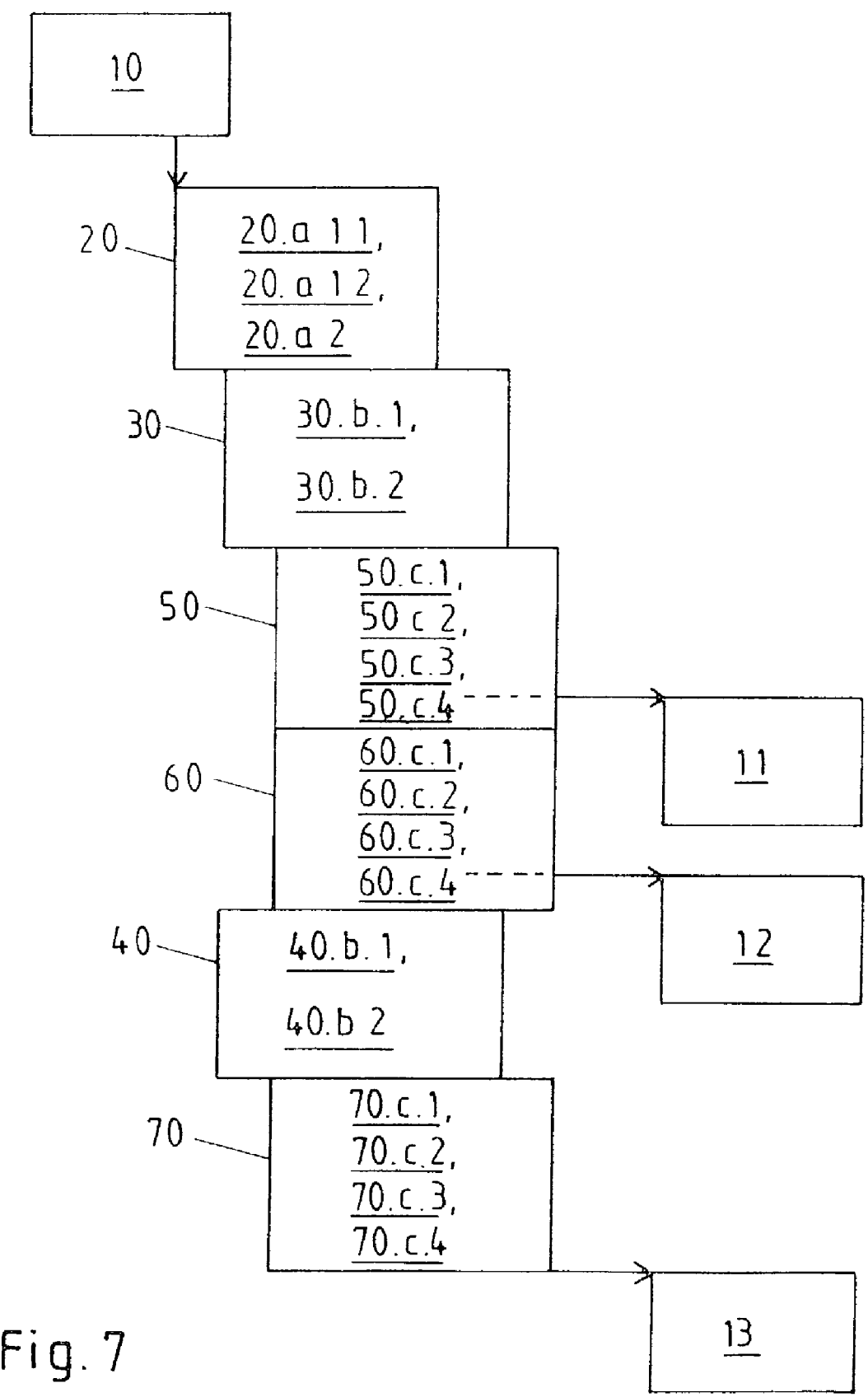
FIG. 7 schematically shows a structure diagram of the interlinked lists in the present invention.

If this model is then implemented, the driving lanes are introduced into the curbs, wherein the driving lanes of the affected curbs are appended as a new annotation as seen in FIG. 7:

A curb 10 is assigned a lane list 20 whose elements 20.*a*.1.1, 20.*a*.1.2, 20.*a*.2 contain lane information on the totality of the two driving lanes assigned to curb 10, namely the lane information on the driving lanes at the beginning of curb 10 (->reference notation 20.*a*.1.1), on the driving lanes at the end of curb 10 (->reference notation 20.*a*.1.2), and on the length of the driving lanes or on the fraction of the length of the driving lanes at curb 10 (->reference notation 20.*a*.2).

The sequence of elements 20.*a*.1.1, 20.*a*.1.2, 20.*a*.2 of lane list 20 here corresponds to the actual sequence of the two driving lanes, i.e., the right-hand driving lane corresponds to the first driving lane, and the left-hand driving lane corresponds to the second driving lane, counting from the outer side of the road.

As can be further seen in FIG. 7, each of the two driving lanes—that is the first (=right-hand) driving lane and the left-hand (second) driving lane—is assigned a lane data list 30 and 40, respectively, whose elements 30.*b*.1, 30.*b*.2 and 40.*b*.1, 40.*b*.2, respectively, contain lane data information on the particular driving lane.

Elements 30.*b*.1, 30.*b*.2 and 40.*b*.1, 40.*b*.2 of lane data lists 30 and 40, respectively, contain lane data information for each of the driving lanes on the direction of the driving lane (->reference notation 30.*b*.1 and 40.*b*.1, respectively) and on the number of the at least one follow-on driving lane succeeding the driving lane (reference notation 30.*b*.2 and 40.*b*.2, respectively). Furthermore, elements 30.*b*.1, 30.*b*.2 and 40.*b*.1, 40.*b*.2 of lane data lists 30 and 40, respectively, contain additional lane data information such as on special uses of the driving lane or other restrictions on the driving lane.

Finally, FIG. 7 also shows that each follow-on driving lane succeeding the driving lane is assigned a follow-on lane list 50 or 60 or 70 whose elements 50.*c*.1, 50.*c*.2, 50.*c*.3, 50.*c*.4 or 60.*c*.1, 60.*c*.2, 60.*c*.3, 60.*c*.4 or 70.*c*.1, 70.*c*.2, 70.*c*.3, 70.*c*.4 include follow-on lane information on the particular follow-on driving lane interlinked with the lane data information of the preceding driving lane.

Elements 50.*c*.1, 50.*c*.2, 50.*c*.3, 50.*c*.4 or 60.*c*.1, 60.*c*.2, 60.*c*.3, 60.*c*.4 or 70.*c*.1, 70.*c*.2, 70.*c*.3, 70.*c*.4 of follow-on lane list 50 or 60 or 70 include follow-on lane information for each of the follow-on driving lanes on the follow-on driving lanes at the beginning of assigned curb 11 or 12 or 13 (->reference notation 50.*c*.1 or 60.*c*.1 or 70.*c*.1), on the follow-on driving lanes at the end of assigned curb 11 or 12 or 13 (->reference notation 50.*c*.2 or 60.*c*.2 or 70.*c*.2), on the direction and/or position of assigned curb 11 or 12 or 13 (->reference notation 50.*c*.3 or 60.*c*.3 or 70.*c*.3) and on the number of the follow-on driving lane (->reference notation 50.*c*.4 or 60.*c*.4 or 70.*c*.4) according to a reference to the identifier of succeeding assigned curb 11 or 12 or 13.

What is claimed is:

1. A method for use in a navigation device of providing a driving lane recommendation for at least one of a plurality of road segments along a selected driving route, comprising:

assigning to the at least one road segment at least one lane list including elements containing lane information regarding driving lanes located within the at least one road segment;

assigning to each of the driving lanes located within the at least one road segment at least one lane data list including elements each containing lane data information on a particular one of the driving lanes;

assigning to each follow-on driving lane located within a new road segment succeeding each of the driving lanes located within the at least one road segment a follow-on lane list containing elements including follow-on lane information on the follow-on driving lane, wherein the follow-on lane information is interlinked with the lane data information of a preceding driving lane; and providing one of an audio and a graphical representation of the driving lane recommendation based on the assigned at least one lane list, the assigned at least one lane data list, and the assigned follow-on lane lists, wherein the driving lane recommendation includes a designation of an optimal lane among the driving lanes of the at least one of the plurality of road segments along the selected driving route.

2. The method as recited in claim 1, wherein the elements of the lane list contain lane information on:

the driving lanes at the beginning of the at least one road segment, the driving lanes at an end of a cell unit, and one of: a length of the driving lanes and a proportion of the length of the driving lanes of the at least one road segment.

3. The method as recited in claim 1, wherein: a sequence of the elements of the at least one lane list corresponds to an actual sequence of the driving lanes.

4. The method as recited in claim 1, wherein: the elements of the at least one lane data list include lane data information on each of the driving lanes on a direction of travel permitted in the driving lane and on at least one follow-on driving lane succeeding the driving lane.

5. The method as recited in claim 1, wherein: the elements of the at least one lane data list include additional lane data information regarding one of a special use of the driving lanes and another restriction of the driving lane.

6. The method as recited in claim 1, wherein: the elements of the at least one follow-on lane list include, for each of the follow-on driving lanes, follow-on lane information on:
   the follow-on driving lanes at the beginning of the associated road segment, the follow-on driving lanes at the end of the associated road segment, at least one of a direction and a position of the associated road segment, and the number of the follow-on driving lane.

7. The method as recited in claim 1, wherein at least one of:
   the driving lane and the follow-on driving lane, of the road segment, is appended as at least one annotation.

8. A system for use in a navigation device of providing a driving lane recommendation for at least one of a plurality of road segments along a selected driving route, comprising:
   an arrangement for assigning to the at least one road segment at least one lane list including elements containing lane information regarding driving lanes located within the at least one road segment;
   an arrangement for assigning to each of the driving lanes located within the at least one road segment at least one lane data list including elements each containing lane data information on a particular one of the driving lanes;
   an arrangement for assigning to each follow-on driving lane located within a new road segment that succeeds each of the driving lanes located within the at least one road segment a follow-on lane list that contains elements including follow-on lane information on the follow-on driving lane, wherein the follow-on lane information is interlinked with the lane data information of a preceding driving lane; and
   an arrangement for providing one of an audio and a graphical representation of the driving lane recommendation based on the assigned at least one lane list, the assigned at least one lane data list, and the assigned follow-on lane lists, wherein the driving lane recommendation includes a designation of an optimal lane among the driving lanes of the at least one of the plurality of road segments along the selected driving route.

9. The system as recited in claim 8, wherein at least one of:
   the driving lane and the follow-on driving lane, of the road segment, is appended as at least one annotation.

* * * * *